Figure 1:
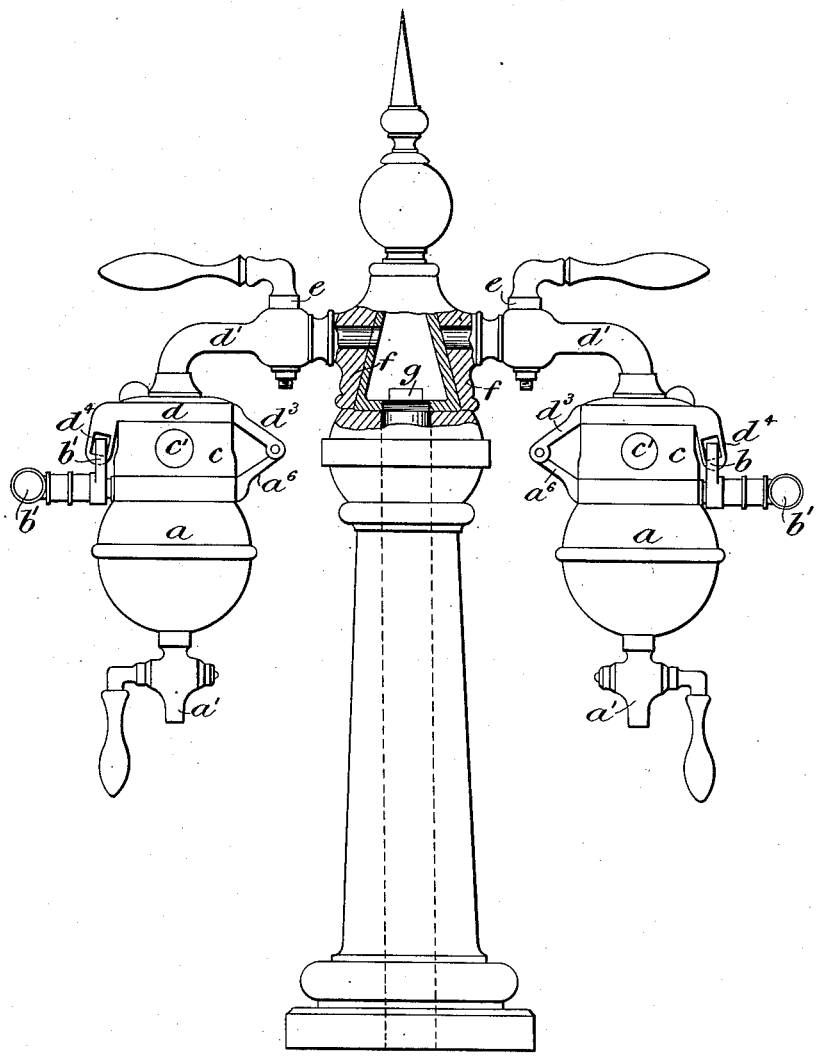

(No Model.) 3 Sheets—Sheet 1.

C. JONES.
APPARATUS FOR MAKING INFUSIONS OR SOLUTIONS.

No. 411,037. Patented Sept. 17, 1889.

Witnesses
B. Miller
C. W. Brooke

Inventor
Charles Jones,
By his Attorneys,
Baldwin Davidson & Wight (No Model.) 3 Sheets—Sheet 2.
C. JONES.
APPARATUS FOR MAKING INFUSIONS OR SOLUTIONS.
No. 411,037. Patented Sept. 17, 1889.
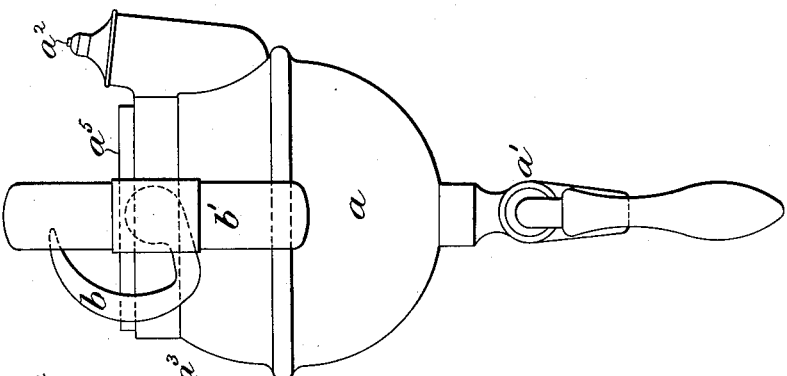
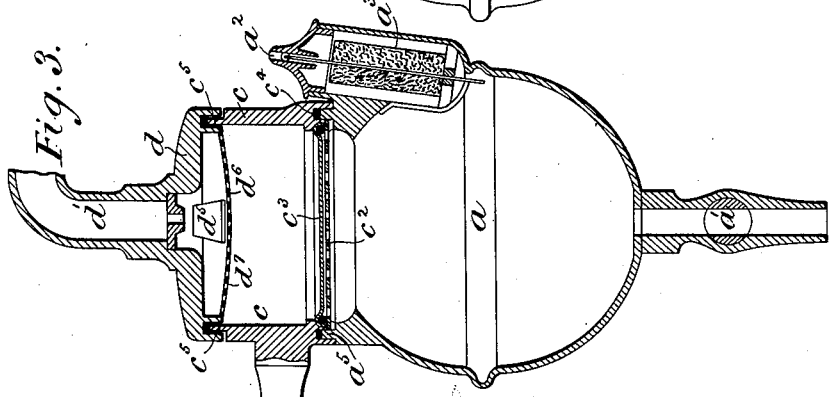
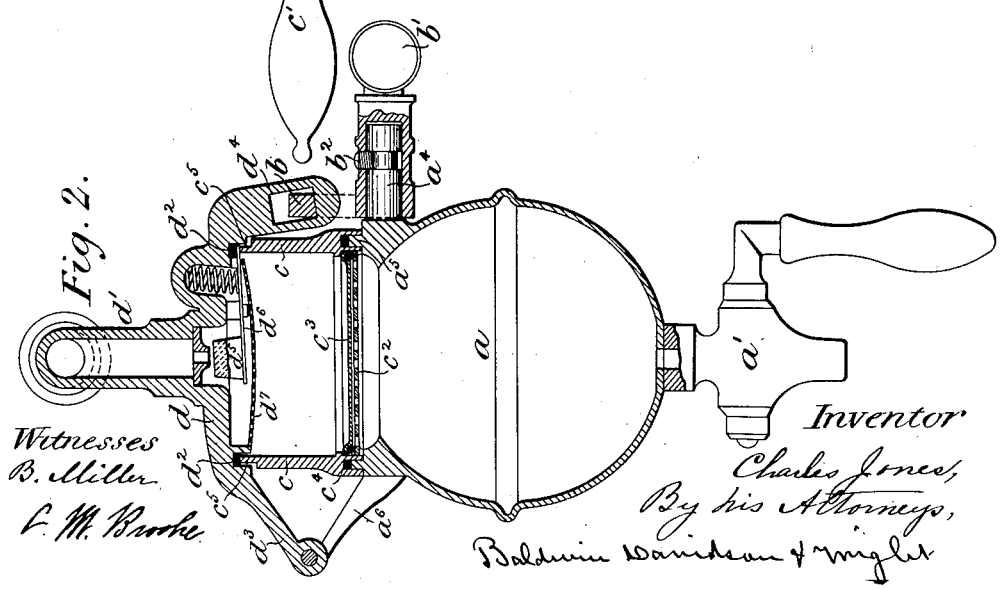
Witnesses
B. Miller
C. W. Brooke
Inventor
Charles Jones,
By his Attorneys,
Baldwin Davidson & Wight (No Model.) 3 Sheets—Sheet 3.

C. JONES.
APPARATUS FOR MAKING INFUSIONS OR SOLUTIONS.

No. 411,037. Patented Sept. 17, 1889.

Witnesses
H. C. Newman.
Louis F. Julihn.

Inventor
Charles Jones
By his Attorneys.
Baldwin, Davidson & Wight.

UNITED STATES PATENT OFFICE.

CHARLES JONES OF WOODFORD, ASSIGNOR TO JAMES CHILDS, OF LONDON, ENGLAND.

APPARATUS FOR MAKING INFUSIONS OR SOLUTIONS.

SPECIFICATION forming part of Letters Patent No. 411,037, dated September 17, 1889.

Application filed April 22, 1889. Serial No. 308,086. (No model.) Patented in England October 10, 1887, No. 13,726.

*To all whom it may concern:*

Be it known that I, CHARLES JONES, builder, a subject of the Queen of Great Britain, lately residing at 24 Eastcheap, in the city of London, but now residing at Maude Villa, Chelmsford Road East, Woodford, England, have invented certain new and useful Improvements in Apparatus for Making Infusions or Solutions, (for which I have received Letters Patent in Great Britain, No. 13,726, dated October 10, 1887,) of which the following is a specification.

This invention has for its object improvements in apparatus for making infusions.

The apparatus has three principal parts—a receiver, a holder for the material to be infused, and a cover.

The receiver is preferably of a globular form, open at the top, and of a capacity to contain one cup or any set quantity of tea, coffee, or other material from which the infusion is to be made. At the bottom the receiver is provided with a tap for drawing off the infusion when made. Upon the top of this receiver the holder for the tea, coffee, or other material is supported, and to make a tight joint between the top of the receiver and the bottom of the holder an annular projection is provided upon the former and it enters a corresponding groove around the bottom of the latter.

The tea or coffee holder has a bottom of perforated metal, upon which a disk of felt or woven fabric with fleecy surface is supported. It also has a handle by which it can be readily removed from the apparatus to be emptied and replaced when charged with fresh material.

The cover fits with a tight joint onto the top of the tea or coffee holder in the same way that the holder itself fits tightly onto the top of the receiver. The cover is fixed horizontally upon the end of a pipe, through which boiling water from a boiler maintained under light pressure can be introduced. I use, preferably, a boiler such as is described in an application for patent bearing even date herewith.

The receiver by an arm extending from it is jointed to an arm which extends from the cover. There is a lug on the cover with a slotted hole through it, and a cam-like hook to engage with it is provided upon the receiver. The hook can be turned by means of a handle, and so made to draw the parts together, so as to close both of the joints tight and capable of resisting pressure.

When water is allowed to pass from the boiler to the apparatus, the water entering the tea or coffee holder descends upon its contents and forces its way through the bed of tea or coffee and through the filtering material into the receptacle. An air-valve is provided upon the receptacle to allow the air to escape as the liquid enters it. A floating valve is used, and when the liquid rises it carries the valve up to its seat and closes the vent. When the vessel is full, the supply of water to the apparatus is closed and the tap at the bottom of the apparatus is opened and the cup of tea or coffee is drawn off.

On the inside of the cover I apply a valve over the mouth of the pipe through which the supply of hot water enters. The valve is made to open whenever the apparatus is closed by its lid and to close whenever the apparatus is opened, so that if the apparatus were opened without previously shutting off the supply of boiling water to it there would be no escape of water from the boiler.

The admission of boiling water to the apparatus may be controlled by any ordinary tap on the pipe leading from the boiler; but preferably I mount a number of the apparatus on the ends of pipes which extend radially from the plug of a tap carried at the top of a standard which forms the water-supply pipe, and I form the tap in such manner that when the assemblage of infusion-making apparatus is turned around the standard boiling water enters each apparatus as it is carried through one part of the revolution and shut off from it at another part.

In order that my said invention may be fully understood and readily carried into effect, I will proceed to describe the drawings hereunto annexed.

Figure 5:
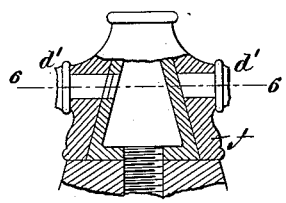
Figure 6:
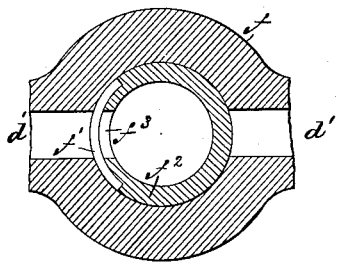

Figure 1 of the drawings hereunto annexed is a side elevation, partly in section, of apparatus arranged as above described. Figs. 2 and 3 are vertical sections, on a larger scale, of that part of the apparatus in which the solutions or infusions are actually to be made. Fig. 4 is a front elevation of the lower part (called the "receiver") of this apparatus. Fig. 5 is a detail sectional view showing the connection between the main supply-pipe and the branch pipes. Fig. 6 is a section on the line 6 6 of Fig. 5 and on an enlarged scale.

$a$ is the globular receiver.

$a'$ is the tap for drawing off the infusion.

$a^2$ is the air-outlet. $a^3$ is the floating valve which closes this outlet when the receiver is full. The valve is of cork. A wire passes through it and enters a guiding-hole at the bottom of the valve-chamber. The wire also enters the outlet $a^2$, so that the valve is effectually controlled in its rise and fall. When the valve closes the outlet, the pin projects, and is visible from the exterior. It thus serves as an indicator.

$a^4$ is a stud on the body of the receiver. It receives the locking-hook $b$, and this is retained in place upon the stud by a screw $b^2$ entering a garter-groove around the stud.

$b'$ is the handle by which the hook is turned.

$a^5$ is the annular projection at the top of the receiver, which, entering a corresponding recess in the bottom of the holder, makes a tight joint.

$a^6$ is the arm of the receiver to which the cover is jointed.

$c$ is the holder into which the coffee or tea is placed. $c'$ is its handle.

$c^2$ is a perforated metal bottom, which is soldered in. Before the bottom is fixed, however, a ring $c^3$, covered with a fleecy cotton fabric, is inserted, and it is driven in up to a shoulder.

$c^4$ is the cavity at the bottom of the holder, which receives the projection $a^5$ on the receiver. An india-rubber ring is placed within this cavity.

$c^5$ is the projection at the top of the holder, which enters a cavity in the cover to make a joint.

$d$ is the cover.

$d'$ is the pipe on the cover, by which the hot water is supplied, and this pipe serves also to carry the apparatus.

$d^2$ is the recess in the cover, which receives the projection $c^5$ upon the holder. In this recess an india-rubber ring is placed.

$d^3$ is the arm of the cover, which is jointed to the arm $a^6$ of the receiver.

$d^4$ is the loop on the cover, which receives the hook $b$, by which the parts of the apparatus are locked securely together.

$d^5$ is the automatic valve for closing the water-inlet when the apparatus is open. It is attached to a lever $d^6$. The end of this lever projects into the recess $d^2$, so that the top of the holder presses upon it when the apparatus is closed.

$d^7$ is a covering of wire-gauze soldered in over the automatic valve.

In Fig. 1 taps $e$ are shown for supplying the hot water to the apparatus and for turning it off; but these taps need not be provided if, as the drawings indicate, the apparatus be carried by a conical ring $f$, fitting over a corresponding cone on a standard through which a water-supply pipe $g$ is led. The pipe $g$ terminates in the cone. At one side of the cone is also an opening, and when the pipe $d'$ comes to this opening the water (which is under a light pressure) passes in, while when the pipe $d'$ does not correspond with the opening the water is cut off. It is convenient that the cone should be grooved, so that a large part of the circle is available for filling, while a smaller part is reserved for drawing off. The construction above referred to is shown in detail in Figs. 5 and 6, in which it will be seen that there is a groove $f'$ extending partly around the exterior of the cone $f^2$. The outlet-orifice $f^3$ of the cone opens into the groove $f'$. The conical ring $f$ fits snugly around the cone $f^2$, but is free to turn thereon. By turning the conical ring into proper position to have one of the openings $d'$ to register with the orifice $f^3$, hot water may be supplied.

What I claim is—

1. The combination, substantially as hereinbefore set forth, of the cover, the pipe fixed to the cover through which boiling water is supplied, the receiver hinged to the cover, the holder interposed between the cover and the receiver and removable therefrom, a perforated bottom held between the holder and the receiver, and a catch for locking the receiver to the cover.

2. The combination, substantially as hereinbefore set forth, of the cover, the pipe to which it is attached and through which boiling water may be admitted, the receiver, the removable holder interposed between the cover and the receiver, and the float-valve in the receiver to allow escape of air while the receiver is filling and which closes when the receiver is sufficiently full.

3. The combination, substantially as hereinbefore set forth, of the cover, the pipe to which it is secured, the receiver, the holder interposed between the cover and the receiver and removable therefrom, the handle for the holder, the perforated bottom piece held between the cover and the receiver, the float-valve $a^3$, and the draw-off tap $a'$ at the bottom of the receiver.

4. The combination, substantially as hereinbefore set forth, of the cover, the supply-pipe to which it is secured, the receiver, the holder interposed between the cover and the receiver, the perforated bottom piece between the holder and the receiver, and the automatic valve $d^5$, interposed between the holder and the supply-pipe to shut off the supply of water when the holder is removed.

5. The combination, substantially as hereinbefore set forth, of the hollow standard through which boiling water is supplied and which is provided with an orifice at its upper end, a ring surrounding the upper end of the standard and adapted to turn thereon to open and close the orifice, the receiver, the cover, the holder interposed between the receiver and the cover, and a pipe leading from the cover and connected with the ring which surrounds the upper end of the standard.

CHARLES JONES.

Witnesses:
   JNO. DEAN,
   W. J. NORWOOD,
*Both of 17 Gracechurch St., London, E. C.*